United States Patent [19]

Wurmb et al.

[11] 4,107,231
[45] Aug. 15, 1978

[54] FLAME-RETARDANT LINEAR POLYESTERS

[75] Inventors: Rolf Wurmb, Heidelburg; Wolfgang Seydl; Klaus Penzien, both of Frankenthal; Hermann Gausepohl, Mutterstadt; Hans-Josef Sterzel, Dannstadt-Schauernheim, all of Fed. Rep. of Germany

[73] Assignee: BASF Aktiengesellschaft, Ludwigshafen, Fed. Rep. of Germany

[21] Appl. No.: 669,740

[22] Filed: Mar. 23, 1976

[30] Foreign Application Priority Data

Apr. 9, 1975 [DE] Fed. Rep. of Germany ....... 2515473

[51] Int. Cl.$^2$ .................. C08L 67/06; C08L 25/06
[52] U.S. Cl. .................. 260/873; 260/45.7 R; 260/45.75 B; 260/DIG. 24; 260/45.7 RT
[58] Field of Search .................. 260/2.5 FP, 45.7 R, 260/873, 106 FP

[56] References Cited

U.S. PATENT DOCUMENTS

| | | | |
|---|---|---|---|
| 3,039,977 | 6/1962 | Ingram | 260/2.5 FP |
| 3,943,195 | 3/1976 | Naarmann | 260/45.7 R X |
| 3,953,394 | 4/1976 | Fox et al. | 260/873 X |
| 3,975,354 | 8/1976 | Buxbaum et al. | 260/45.7 R X |

*Primary Examiner*—Thomas De Benedictis, Sr.
*Attorney, Agent, or Firm*—Keil, Thompson & Shurtleff

[57] ABSTRACT

Flame-proofed linear polyesters containing, as flame-proofing agents, halogenated oligomeric styrenes and synergistic compounds.

8 Claims, No Drawings

FLAME-RETARDANT LINEAR POLYESTERS

This invention relates to molding compositions of linear polyesters and flame-proofing agents.

Linear polyesters capable of being injection-molded have become significant materials. Particularly interesting members of this class of substances are fast-crystallizing polyesters such as polypropylene terephthalate and polybutylene terephthalate. To increase their strength and rigidity, reinforcing fillers may be incorporated in such polyesters. It is also known to flame-proof unreinforced and reinforced polyesters with combinations of organic halogen compounds and synergistic substances, particularly antimony trioxide. For example, German Published Application No. 2,042,450 describes combinations of aromatic halogen compounds and antimony trioxide. These halogen compounds, however, are substances of low molecular weight. The prior art flame-proofed polyester molding compositions suffer from the drawback that white crusts form on the surface of shaped articles made therefrom. This is particularly undesirable when the shaped articles are used in the electrical industry, for example as supports for current-carrying parts, since the crust formation reduces the surface resistance and thus the insulating effect.

It is an object of the present invention to obviate the above drawbacks of the prior art.

The invention relates to molding compositions based on linear saturated polyesters and containing, as flame-proofing agents, halogen compounds and synergistic compounds and also containing, if desired, fillers and reinforcing fibers. The molding compositions of the invention are characterized in that they contain, as flame-proofing halogen compounds, halogenated oligomeric styrenes. Preferably, the degree of polymerization of the oligomers is from 3 to 20, cyclic oligomers also being suitable. According to a preferred embodiment of the invention, the halogenated oligomeric styrenes to be used have the formula I below, where $x$ denotes halogen and R denotes hydrogen or an aliphatic radical, particularly an alkyl radical such as $CH_3$ or $C_2H_5$, n being the degree of polymerization.

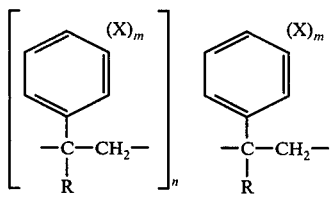

Of the halogen substituents $x$, bromine is particularly preferred. The compounds contain from 40 to 80% of bromine. Some of the substances are infusible and substantially insoluble substances. They may be prepared either by bromination of oligomeric styrenes such as are obtained by thermopolymerization of styrene or by polymerization of suitable brominated styrenes.

Suitable synergistic compounds for the brominated oligomeric styrene are virtually all of the known compounds of this kind, particularly preferred compounds being oxides of metals in the group Vb of the Periodic Table, particularly antimony trioxide. A particularly effective substance is antimony trioxide which has been precipitated onto suitable inorganic supports such as finely divided kaolin, calcined kaolin or talc.

The amount of brominated oligomeric styrenes required to flameproof the polyesters depends on their bromine content. The bromine content in the composition of the invention should be from 3 to 10% and preferably from 5 to 8%. The content of antimony trioxide is between 2 and 10% and preferably between 3 and 6%. In addition, well-known anti-drip additives such as colloidal $SiO_2$ or polytetrafluoroethylene powder may be added.

The molding compositions may also contain reinforcing agents and fillers. Examples of such substances are glass fibers, preferably of low-alkali E-glass having diameters of from 6 to 20 μm, carbon fibers, potassium titanate fibers, glass spheres, whiskers, talc, wollastonite, kaolin, calcined kaolin and chalk. The content of said additives may be up to 60% by weight but will normally be between 10 and 40% by weight. Advantageously, they are provided with adhesion promoters based on silanes or, if desired, with additional sizing agents.

The molding compositions of the invention preferably contain polybutylene terephthalate, which may be modified with up to 15% molar of other dicarboxylic acids or alcohols. Suitable modifying agents are, for example, aliphatic dicarboxylic acids of up to 20 carbon atoms, cycloaliphatic or aromatic dicarboxylic acids with 1 or 2 aromatic rings. Examples thereof are adipic acid, sebacic acid, cyclohexanedioic acid, isophthalic acid and 2,7- and 2,6-naphthalenedioic acid.

Suitable alcoholic modifying components are, in particular, aliphatic and cycloaliphatic glycols of from 2 to 10 carbon atoms, such as ethylene glycol, propylene glycol, hexamethylene glycol, neopentyl glycol and 1,4-bishydroxymethylcyclohexane.

The polybutylene terephthalate used in the molding compositions of the invention have K values of from 55 to 80 and preferably from 65 to 75, as measured by the method proposed by H. Fikentscher in Cellulosechemie 13, 58 (1932), in a 3:2 w/w mixture of phenol and o-dichlorobenzene at 25° C in the form of a 0.5% solution.

In addition to the additives of the invention, the polyester molding compositions may contain further additives such as stabilizers to counteract thermal, thermooxidative and ultraviolet attack, dyes, pigments and processing auxiliaries ensuring trouble-free extrusion and injection molding.

The thermoplastic molding compositions are preferably prepared by mixing granulated polybutylene terephthalate with the additives of the invention, followed by melting, incorporation of the fillers and homogenization in a suitable extruder, for example type ZSK by Werner & Pfleiderer, Stuttgart, extrusion into a coolant, granulation and drying.

In the following Examples the parts are by weight.

EXAMPLES

Granulated polybutylene terephthalate (K values 72.5) was melted in a single-shaft extruder at 250° C, mixed with the additives of the invention, homogenated and extruded through a die, the extrudate being cooled and granulated.

Specimens measuring 63.5 × 12.5 × 3.2 mm were injection-molded from the resulting granules at a plastics temperature of 250° C. The data listed in the Table below were obtained on testing said specimens. The burning properties were determined in a manner similar to that laid down in Underwriters Laboratories' method No. 94, and the crust or white deposit was assessed visually after storage of the specimens for 7 days at 140° C.

TABLE

| Test | Burning properties | Deposit after storage at 140° C for 7 days |
|---|---|---|
| 8 parts of decabromodiphenyl oxide<br>6 parts of antimony trioxide<br>30 parts of glass fibers<br>56 parts of polybutylene terephthalate (K value 72)<br>[comparative test] | 0–6 seconds no dripping | thick deposit |
| 10 parts of oligomeric tribromostyrene<br>6 parts of antimony trioxide<br>30 parts of glass fibers<br>54 parts of polybutylene terephthalate (K value 72) | 4–12 seconds no dripping | no deposit |
| 8 parts of oligomeric tribormostyrene<br>6 parts of antimony trioxide on talc<br>30 parts of glass fibers<br>56 parts of polybutylene terephthalate (K value 72) | 0–5 seconds no dripping | no deposit |
| 9 parts of oligomeric tribromostyrene<br>6 parts of antimony trioxide<br>4 parts of polytetrafluoroethylene resin having an average particle size of 500 μm<br>81 parts of polybutylene terephthalate (K value 72) | 1 second no dripping | no deposit |

We claim:

1. Linear polyesters flame-proofed with halogenous flame-proofing agents and synergists and optionally containing fillers and reinforcing fibers, the flame-proofing agents being halogenated oligomeric styrenes of the formula I

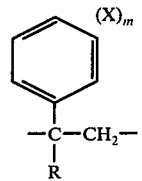

where $x$ denotes halogen, R denotes hydrogen or an aliphatic radical, $n$ is an integer of from 3 to 20 and $m$ is an integer of from 1 to 5.

2. Linear polyesters as set forth in claim 1 wherein the halogen is bromine.

3. Polyester compositions as set forth in claim 2, wherein the content of halogenated oligomeric styrenes is such that the bromine content of the composition is from 3 to 10%.

4. Polyester compositions as set forth in claim 2, wherein the polyester is polybutylene terephthalate 5. Polyester compositions as claimed in claim 2, wherein the synergistic substance is antimony trioxide.

6. Linear polyesters as set forth in claim 5 wherein the bromine content in the composition is 5 to 8% and the amount of antimony trioxide is from 2 to 10%.

7. Linear polyesters as set forth in claim 2 wherein R is H.

8. Linear polyesters as set forth in claim 2 wherein R is lower alkyl.

* * * * *